United States Patent Office 3,462,444
Patented Aug. 19, 1969

3,462,444
NOVEL 4-BENZYLPIPERIDINE DERIVATIVES
Arnold Heyworth Beckett, Bromley, Norman James Harper, Harrow, and Alma Beryl Simmonds, London, England, assignors to Arnold Heyworth Beckett, Bromley, Kent, England
No Drawing. Filed Oct. 9, 1961, Ser. No. 143,572
Claims priority, application Great Britain, Oct. 20, 1960, 36,080/60
Int. Cl. C07d 29/12, 29/20; A61k 27/00
U.S. Cl. 260—294.7      7 Claims This invention relates to novel 4-benzylpiperidine derivatives having valuable pharmacodynamic activity.

More specifically, compounds of this invention have analgesic and central nervous system depressant activity. These compounds exhibit anti-amphetamine activity and in addition are blockers of conditioned response.

The novel 4-benzylpiperidine derivatives of this invention are represented by the following general formula:

FORMULA I

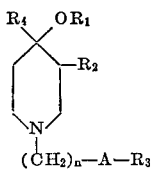

when:
A represents C=O or CHOH;
$R_1$ represents hydrogen or lower acyl;
$R_2$ represents hydrogen or lower alkyl;
$R_3$ represents phenyl, halophenyl, lower alkoxyphenyl, lower alkylphenyl, aminophenyl, trifluoromethylphenyl, thienyl or lower alkythienyl;
$R_4$ represents benzyl, halobenzyl, dihalobenzyl, lower alkoxybenzyl, lower alkylbenzyl, aminobenzyl or trifluoromethylbenzyl; and
$n$ represents an integer 2,3, or 4.

Preferred compounds of this invention are represented by the following structural formula:

FORMULA II

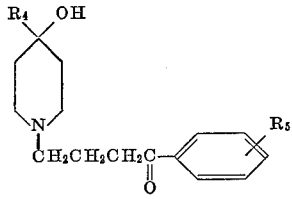

when:
$R_4$ represents chlorobenzyl, fluorobenzyl, bromobenzyl, dichlorobenzyl, methoxybenzyl, methylbenzyl, aminobenzyl or trifluoromethylbenzyl; and
$R_5$ represents chloro, fluoro, bromo, methoxy, methyl, amino or trifluoromethyl.

The substituents of $R_4$ and $R_5$ are preferably in the para position.

Preferred and advantageous compounds of this invention are represented by the following structural formula:

FORMULA III

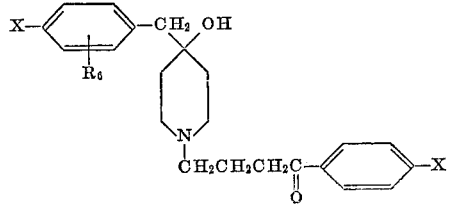

when:
X represents halogen having an atomic weight of less than 80, that is fluoro, chloro or bromo; and
$R_6$ represents hydrogen or halogen having an atomic weight of less than 80.

The terms "lower acyl," "lower alkyl" and "lower alkoxy" where used herein denote groups having 1 to 4 carbon atoms, preferably 1 to 2 carbon atoms. The term "halophenyl" used herein denotes phenyl moieties substituted by halogen having an atomic weight of less than 80, such as chloro, fluoro or bromo.

This invention also includes pharmaceutically acceptable salts of the above defined bases formed with nontoxic organic and inorganic acids. Such salts are easily prepared by methods known to the art. The base is reacted with an excess of organic or inorganic acid in a lower alkanol solvent, such as methanol or, preferably, ethanol, with isolation of the salt by filtration. Exemplary of such organic salts are those with maleic, fumaric, ascorbic, succinic, methanesulfonic, ethanedisulfonic, acetic, tartaric, salicylic, citric, lactic, malic, benzene sulfonic and theophylline acetic acids as well as with the 8-halotheophyllines, for example 8-bromotheophylline. Exemplary of such inorganic salts are those with hydrochloric, hydrobromic, sulfuric, phosphoric and nitric acids. Of course, these salts may also be prepared by the classical method of double decomposition of appropriate salts which is well-known to the art.

The compounds of this invention according to Formula I above in which $R_1$ is hydrogen and A is C=O are prepared by treating an appropriate N-benzyl piperidone of Formula IV below with an appropriate benzyl magnesium halide having the formula $R_4MgX$ in which $R_4$ is as defined above and X is halogen. The reaction is advantageously carried out at room temperature in an ether solution for about 5 to 15 minutes. The resulting organo-metallic complex is decomposed by treatment with ice water and acetic acid. Treatment with excess base such as ammonia yields an amino alcohol of Formula V below. The N-benzyl group of Formula V is removed by catalytic hydrogenation. The reaction is advantageously carried out in a lower alkanol solution using a hydrogenation catalyst such as palladium-on-charcoal or platinum oxide to give the secondary base of Formula VI below:

FORMULA IV    FORMULA V    FORMULA VI

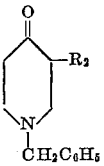 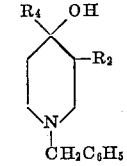 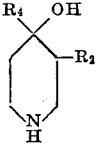

The terms $R_2$ and $R_4$ are as defined above.

Reaction of the secondary base of Formula VI with the methiodide of a Mannich base having the general Formula VII below, in the presence of dimethylformamide and sodium carbonate gives the piperidine derivative of Formula I above in which $n$ is 2 and $R_1$ is hydrogen. Reaction of the secondary base with a haloalkyl carbonyl compound having the general Formula VIII below by refluxing the reactants in an inert organic solvent, such as for example toluene or xylene, in the presence of a trace of an alkali metal bicarbonate, such as sodium or potassium bicarbonate and a trace of an alkali metal iodide, for exmple potassium iodide, gives the desired piperidines of Formula I in which $R_1$ is hydrogen.

FORMULA VII    FORMULA VIII

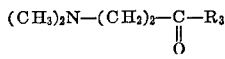 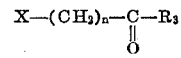

The terms $R_3$ and $n$ are as defined above and X is halogen.

The starting materials of Formula VIII are either known to the art or are prepared by known methods such as by Friedel Crafts reaction:

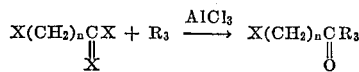

according to Janssen et al., J. Med. Pharm. Chem., 1:281 (1959).

To prepare the compounds of Formula I in which $R_1$ is a lower acyl group, the corresponding hydroxy compound is heated, conveniently at reflux, with a mixture of the appropriate organic acid anhydride and an organic base such as pyridine.

The compounds of Formula I in which A is CHOH are prepared by reduction of the corresponding carbonyl compound, i.e. Formula I in which A is C=O. The reduction is conveniently carried out with an aluminium isopropoxide in alcohol or organic hydrocarbon solution such as in isopropanol or toluene.

The following examples are not limiting but are illustrative of the compounds of this invention and the procedures for their preparation and will serve to make fully apparent all of the compounds embraced by the general formulas given above.

EXAMPLE 1

4-chlorobenzyl magnesium chloride, prepared from 4-chlorobenzyl chloride (84 g.) and magnesium (13.7 g.), is stirred with N-benzyl-4-piperidone (50 g.) in ether. The product is added to crushed ice and acidified with acetic acid. The resulting aqueous liquid is made alkaline with ammonia and the desired base is extracted with ether. After drying with sodium sulfate, the solvent is removed to give crude N-benzyl-4-(4'-chlorobenzyl)-4-piperidinol. This base on treatment with an excess of ethanolic hydrochloric acid gives the hydrochloric salt of N-benzyl-4-(4'-chlorobenzyl)-4-piperidinol, M.P. 215° C. after crystallization from ethanol.

A solution of N-benzyl-4-(4'-chlorobenzyl)-4-piperidinol hydrochloride (40 g.) in ethanol (1 l.) is shaken with hydrogen in the presence of 10% palladium-on-charcoal (10 g.) at atmospheric pressure and 40° C. until 2,500 ml. of hydrogen has been absorbed. The resulting product is filtered; the filtrate is concentrated and diluted with ether. The 4-(4'-chlorobenzyl)-4-piperidinol hydrochloride which separates melts at 226° C. after crystallization from ether-ethanol.

2-dimethylaminopropiophenone methiodide (7 g.) and sodium carbonate (1 g.) are added to 4-(4'-chlorobenzyl)-4-piperidinol in 25 ml. of dimethylformamide. The 4-(4'-chlorobenzyl)-4-piperidinol is obtained by adding ammonia solution to an aqueous solution of 4-(4'-chlorobenzyl)-4-piperidinol hydrochloride (5.2 g.) prepared in the manner described above, and extracting the free base with ether, followed by removal of the solvent. Dry nitrogen is bubbled through the mixture for 4 hours. The resulting product is diluted with water and extracted with ether. After drying with sodium sulfate, the solvent is removed and the resulting residue converted by the addition of an excess ethanolic hydrochloric acid to the hydrochloride salt of 3-[4'-(4"-chlorobenzyl)-4'-hydroxy-piperidino]-propiophenone which melts at 206° C. after crystallization from ethanol.

EXAMPLE 2

A mixture of 4-(4'-chlorobenzyl)-4-piperidinol, obtained from its hydrochloride salt (8.4 g.) in the manner described in Example 1, 4-chloro-4'-fluorobutyrophenone (7.6 g.) and sodium bicarbonate (2 g.) in toluene (400 ml.) is refluxed in the presence of a trace of potassium iodide for 3 days. The product is filtered, concentrated and the resulting crystals of 4-[4'-(4"-chlorobenzyl)-4'-hydroxy-piperidino]-4'-fluorobutyrophenone hydrochloride which separate out on cooling are collected. After crystallization from ethanol the crystals melt at 198° C.

Similarly using 4-chloro-4'-methylbutyrophenone (prepared by Friedel Crafts reaction of 4-chlorobutyryl chloride and toluene) in place of 4-chloro-4'-fluorobutyrophenone in the procedure described above, 4[4'-(4"-chlorobenzyl) - 4'-hydroxy-piperidino]-4'-methylbutyrophenone hydrochloride is obtained. The hydrochloride salt melts at 218° C. after recrystallization.

Using 4-chloropropyl 2'-thienyl ketone (prepared by Friedel Crafts reaction of 4-chlorobutyryl chloride and thiophene) in place of 4-chloro-4'-fluorobutyrophenone in the above procedure gives 4-[4'-(4"-chlorobenzyl)-4'-hydroxypiperidino]propyl 2-thienyl ketone hydrochloride, M.P. 174° C.

EXAMPLE 3

Reacting 4-chlorobenzyl magnesium chloride in ether with N-benzyl-3-methyl-4-piperidone, prepared by reacting benzyl chloride with 3-methyl-4-piperidone, and debenzylating the resulting intermediate as in Example 1 gives 4-(4'-chlorobenzyl)-3-methyl-4-piperidinol which is reacted with 4-chloro-4'-fluorobutyrophenone as in Example 1 to give 4-[4'-(4"-chlorobenzyl)-4'-hydroxy-3'-methylpiperidino]-4'-fluorobutyrophenone hydrochloride, M.P. 203° C.

EXAMPLE 4

4 - [4' - (4" - chlorobenzyl)-4'-hydroxypiperidino]-4'-methylbutyrophenone (obtained by treating an aqueous solution of its hydrochloride salt, prepared as in Example 2, with excess ammonia and extracting with ether) is refluxed for 3 hours with a mixture of propionic anhydride (3 ml.) and pyridine (3 ml.). The solvents are then removed under reduced pressure and the residue on treatment with ethanolic hydrochloric acid gives the hydrate hydrochloride salt of 4 - [4' - propionoxy-4'-(4"-chlorobenzyl)-piperidino]-4'-methylbutyrophenone, M.P. 126° C., after crystallization from ethanol.

EXAMPLE 5

3,4-dichlorobenzyl magnesium chloride, prepared from 3,4-dichlorobenzyl chloride (25.0 g) and magnesium (3.0 g.) is stirred with N-benzyl-4-piperidone (18.9 g.) in ether. The product is added to crushed ice and acidified with acetic acid. The resulting aqueous liquid is made alkaline with ammonia and the desired base extracted with ether. After drying with sodium sulfate, the solvent is removed to give crude N-benzyl-4-(3',4'-dichlorobenzyl)-4-piperidinol. This base on treatment with an excess of ethanolic hydrochloric acid gives N-benzyl-4-(3',4'-dichlorobenzyl-4-piperidinol hydrochloride, M.P. 212–213° C. from ethanol-ether.

A solution of N-benzyl-4-(3',4'-dichlorobenzyl)-4-piperidinol hydrochloride (24.3 g.) in ethanol (500 cc.) is shaken with hydrogen in the presence of 10% palladium-on-charcoal (5.0 g.) at atmospheric pressure until approximately 1400 cc. of hydrogen is absorbed. The resultant product is filtered, the filtrate evaporated to dryness and the residue crystallized from ethanol-ether to give 4-(3',4'-dichlorobenzyl)-4-piperidinol hydrochloride, M.P. 206–208° C.

4-(3',4'-dichlorobenzyl) - 4 - piperidinol hydrochloride (7.5 g.) is suspended in water and made alkaline with ammonia. The basic material is extracted with ether. A mixture of the base, 4-chloro-4'-fluorobutyrophenone (8.0 g.), sodium bicarbonate (2.3 g.), potassium iodide (0.1 g.) and dry toluene (100 cc.) is refluxed for 50 hours. The reaction mixture is filtered and the filtrate evaporated to give an oil which is dissolved in ethanolic hydrochloric acid. On evaporation a solid is obtained which crystallizes from isobutyl methyl ketone to give 4-[4'-(3", 4"-dichlorobenzyl)-4'-hydroxy-piperidino]-4'-fluorobutyrophenone hydrochloride, M.P. 190–191° C.

EXAMPLE 6

4-(3',4'-dichlorobenzyl) - 4 - piperidinol hydrochloride (6.0 g.), prepared as described in Example 5, is converted to the free base. A mixture of the base, 4-chloro-4'-chlorobutyrophenone (6.9 g.) prepared by Friedel Crafts reaction of 4-chlorobutyryl chloride and chlorobenzene, sodium bicarbonate (1.85 g.), potassium iodide (0.1 g.) and dry toluene (80 cc.) is refluxed for 60 hours. The reaction mixture is filtered and the filtrate evaporated to give an oil which is dissolved in ethanolic hydrochloric acid. Evaporation gives a solid which crystallizes from ethanol-ether to give 4-[4'-(3",4'-dichlorobenzyl)-4'-hydroxypiperidino]-4'-chlorobutyrophenone hydrochloride, M.P. 146–147° C.

EXAMPLE 7

2,4-dichlorobenzyl magnesium chloride prepared from 2,4-dichlorobenzyl chloride (25.0 g.) and magnesium (3.0 g.) is stirred with N-benzyl-4-piperidone (18.9 g.) in dry ether (100 cc.). The product is added to crushed ice and acidified with acetic acid. The resulting aqueous liquid is made alkaline with ammonia and the desired base extracted with ether. After drying with sodium sulfate, the solvent is removed to give crude N-benzyl-4-(2',4'-dichlorobenzyl)-4-piperidinol. This, on treatment with an excess of ethanolic hydrochloric acid, gives N-benzyl-4-(2',4'-dichlorobenzyl)-4-piperidinol hydrochloride, M.P. 208–209° C. from ethanol-ether.

A solution of N-benzyl-4-(2',4'-dichlorobenzyl)-4-piperidinol hydrochloride (28.0 g.) in ethanol (500 cc.) is shaken with hydrogen in the presence of 10% palladium-on-charcoal (5.0 g.) at atmospheric pressure until approximately 1600 cc. of hydrogen is absorbed. The resultant product is filtered; the filtrate is evaporated to dryness, made alkaline with ammonia and extracted with ether. Evaporation of the ethereal extracts gives an oil which solidifies. Crystallization of this solid from petroleum ether (80–100° C.) gives 4-(2',4'-dichlorobenzyl)-4-piperidinol, M.P. 137–138° C.

A mixture of 4-(2',4'-dichlorobenzyl)-4-piperidinol (6.5 g.), 4-chloro-4'-fluorobutyrophenone (8.0 g.), sodium bicarbonate (2.3 g.), potassium iodide (0.1 g) and dry toluene (100 cc.) is refluxed for 50 hours. The reaction mixture is filtered and the filtrate evaporated to give an oil which is dissolved in ethanolic hydrochloric acid. On evaporation a solid is obtained which crystallizes from isopropanol to give 4-[4'-(2",4"', dichlorobenzyl)-4'-hydroxypiperidino]-4'-fluorobutyrophenone hydrochloride, M.P. 189.5–191° C.

EXAMPLE 8

A mixture of 4-(2',4'-dichlorobenzyl)-4-piperidinol (3.9 g.), prepared as described in Example 7,4-chloro-4'-chlorobutyrophenone (5.2 g.), sodium bicarbonate (1.5 g.), potassium iodide (0.06 g.) and dry toluene (100 cc.) is refluxed for 50 hours. The reaction mixture is filtered and the filtrate evaporated to give an oil which is dissolved in ethanolic hydrochloric acid. On evaporation a solid is obtained which is crystallized from ethanol-ether to give 4-[4'-(2",4"-dichlorobenzyl)-4'-hydroxypiperidino]-4'-chlorobutyrophenone hydrochloride, M.P. 190–191° C.

EXAMPLE 9

A mixture of 4-[4'-(4"-chlorobenzyl)-4'-hydroxy-3'-methypiperidyl] - 4' - fluorobutyrophenone obtained by neutralizing its hydrochloride salt (70 g.) (prepared as in Example 3,aluminium isopropoxide (10.3 g.) and isopropanol (75 cc.) is heated in an oil bath maintained at 100° C. until no more acetone is evolved. The solvent is then removed by distillation under reduced pressure and the residue is dissolved in dilute hydrochloric acid. The aqueous solution is made alkaline with concentrated ammonia solution and the desired base is extracted with chloroform. After drying with sodium sulfate, the solvent is removed and the residue on treatment with ethanolic hydrochloric acid gives 1-[4'-(4"-fluorophenyl)-4'-hydroxybuyl]-3-methyl-4-(4'-chlorobenzyl) - 4 - hydroxypiperidine hydrochloride M.P. 140° C. after crystallization from acetone-ether.

Similarly, 3 - [4'-(4"-chlorobenzyl-4'-hydroxy-piperidino]-propiophenone, 4-[4'-(4"-chlorobenzyl)-4'-hydroxypiperidino] - 4'-fluorobutyrophenone, 4-[4'-(4"-chlorobenzyl)-4'-hydroxy-piperidino]propyl 2-thienone ketone, 4 - [4'-(4"-chlorobenzyl)-4'-hydroxy - piperidino] - 4'-methylbutyrophenone are reduced by the procedure described above to give 1-(3'-phenyl-3'-hydroxypropyl)-4-(4'-chlorobenzyl)-4-hydroxypiperidine, 1 - [4'(4"-fluorophenyl)-4'-hydroxybutyl]-4-(4'-chlorobenzyl)-4-hydroxypiperidine 1-[4'-(2"-thienyl)-4'-hydroxybutyl] - 4 - (4'-chlorobenzyl)-4-hydroxypiperidine and 1-[4'-(4"-methylphenyl)-4'-hydroxybutyl]-4-(4'-chlorobenzyl)-4-hydroxypiperidine respectively.

EXAMPLE 10

Following the procedure of Example 5 and using in place of 3,4-dichlorobenzyl chloride equimolar amounts of the following starting materials:

4-bromobenzyl chloride,
4-trifluoromethyl benzyl bromide,
4-methylbenzyl chloride,
2-ethylbenzyl chloride,
3-fluorobenzyl chloride,
4-methoxybenzyl chloride,
4-butylbenzyl chloride.

The following products are obtained, respectively:

4-[4'-(4"-bromobenzyl)-4'-hydroxypiperidino]-
  4'-fluorobutyrophenone,
4-[4'-(4"-trifluoromethylbenzyl)-4'-hydroxypiperidino]-
  4'-fluorobutyrophenone,
4-[4'-(4"-methylbenzyl)-4'-hydroxypiperidino]-
  4'-fluorobutyrophenone,
4-[4'-(2"-ethylbenzyl)-4'-hydroxypiperidino]-
  4'-fluorobutyrophenone,
4-[4'-(3"-fluorobenzyl)-4'-hydroxypiperidino]-
  4'-fluorobutyrophenone,
4-[4'-(4"-methoxybenzyl)-4'-hydroxypiperidino]-
  4'-fluorobutyrophenone,
4-[4'-(4"-butylbenzyl)-4'-hydroxypiperidino]-
  4'-fluorobutyrophenone.

EXAMPLE 11

Reacting 6.7 g. of 4-(4'-chlorobenzyl)-4-piperidinol, made as in Example 1, with the following ketones by the procedure of Example 2:

|   | G. |
|---|---|
| Chlorovalerophenone | 6.3 |
| 4'-butoxy-3-chloropropiophenone | 8.0 |
| 3-chloro-4'-methoxypropiophenone | 7.5 |
| 4-chloropropyl 2'-propyl-5'-thienyl ketone (prepared by Friedel Crafts reaction of 4-chlorobutyryl chloride and 2-propylthiophene according to the procedure of Janssen, J. Med. Pharm. Chem. 1:281, 1959) | 8.0 |
| 4-chloropropyl 3'-methyl-2'-thienyl ketone (prepared by Friedel Crafts reaction of 4-chlorobenzyl chloride and 3-methylthiothene | 7.5 | gives the following products, respectively:

5-[4'-(4"-chlorobenzyl)-4'-hydroxy-piperidino]-
  valerophenone,
3-[4'-(4"-chlorobenzyl)-4'-hydroxypiperidino]-
  4'-butoxypropiophenone,
3-[4'-(4"-chlorobenzyl)-4'-hydroxypiperidino]-
  4'-methoxypropiophenone,
4-[4'-(4"-chlorobenzyl)-4'-hydroxypiperidino]-
  propyl 5-propyl-2-thineyl ketone,
4-[4'-(4"-chlorobenzyl)-4'-hydroxypiperidino]-
  propyl 3-methyl-2-thienyl ketone.

EXAMPLE 12

An ether solution of 4-trifluoromethylbenzene magnesium bromide is added to an excess of 4-chlorobutyric acid anhydride (prepared by reacting 4-chlorobutyryl chloride with the sodium salt of 4-chlorobutyric acid) in ether and stirred at −50 to −60° C. for 30 minutes. The temperature is allowed to rise to −10° C. for 30 minutes. A saturated solution of ammonium chloride is added and the ether layer is separated, dried and concentrated. The residue is distilled to give 4-chloro-4'-trifluoromethyl-butyrophenone.

As in Example 5 4-fluorobenzyl magnesium chloride is reacted with N-benzyl-4-piperidone in ether solution. Working up gives N-benzyl-4-(4'-fluorobenzyl)-4-piperidinol which is converted to the hydrochloride salt and hydrogenated to give 4-(4'-fluorobenzyl)-4-piperidinol hydrochloride. This salt is converted to the free base.

Six grams of 4-(4'-fluorobenzyl)-4-piperidinol, 7.5 g. of 4-chloro-4'-trifluoromethylbutyrophenone, 2.5 g. of sodium bicarbonate and 0.1 g. of potassium iodide are refluxed in toluene for 48 hours. Working up as in Example 5 gives 4-[4'-(4'-fluorobenzyl)-4'-hydroxypiperidino]-4'-trifluoromethyl-butyrophenone.

The free base in ethanol is treated with an excess of ethereal hydrogen bromide to give the hydrobromide salt.

EXAMPLE 13

A mixture of 6.0 g. of 4-(4'-fluorobenzyl)-4-piperidinol, prepared as in Example 12, 6.0 g. of 4-chloro-4'-fluorobutyrophenone, 2.5 g. of sodium bicarbonate, 0.5 g. of potassium iodide and 300 ml. of toluene is heated at reflux for 40 hours. Working up as in Example 2 gives 4-[4'-(4''-fluorobenzyl) -4-' - hydroxy - piperidino] - 4'-fluorobutyrophenone.

Reduction of the above prepared ketone with aluminium isopropoxide and isopropanol gives 1-[4'-(4''-fluorophenyl) - 4' - hydroxybutyl] - 4 - (4'-fluorobenzyl)-4-hydroxypiperidine.

Treating a solution of the free base in ethyl acetate with excess maleic acid gives the maleate salt.

A sample of 4-[4'-(4''-fluorobenzyl)-4'-hydroxy-piperidino]-4'-fluorobutyrophenone is refluxed with excess acetic anhydride and pyridine for 3.5 hours. Concentrating in vacuo and treating the residue with ethanolic hydrochloric acid gives 4-[4'-acetoxy-4'-(4''-fluorobenzyl)-piperidino]-4'-fluorobutyrophenone hydrochloride.

EXAMPLE 14

N-benzyl-3-ethyl-4-piperidone, prepared by reacting benzyl chloride with 3-ethyl-4-piperidone, is reacted with 4-fluorobenzyl magnesium chloride to give N-benzyl-4-(4'-fluorobenzyl)-3-ethyl-4-piperidinol. Hydrogenation of this N-benzyl compound as in Example 5 gives 4-(4'-fluorobenzyl)-3-ethyl-4-piperidinol.

A toluene solution of 7.1 g. of 4-(4'-fluorobenzyl)-3-ethyl-4-piperidinol, 6.5 g. of 4-chloro-4'-fluorobutyrophenone, 2.5 g. of sodium bicarbonate and a trace of potassium iodide is heated at reflux for four days. Working up as in Example 5 gives 4-[4'-(4''-fluorobenzyl)-3'-ethyl-4'-hydroxypiperidino]-4'-fluorobutyrophenone.

An ethyl acetate solution of the free base is treated with excess citric acid to give, upon concentration and cooling, the citrate salt.

What is claimed is:
1. A chemical compound of the formula:

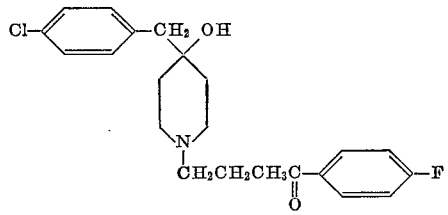

2. A chemical compound of the formula:

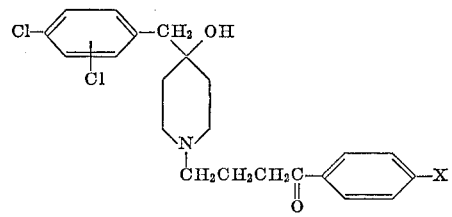

in which X is halogen having an atomic weight of less than 80.

3. A chemical compound of the formula:

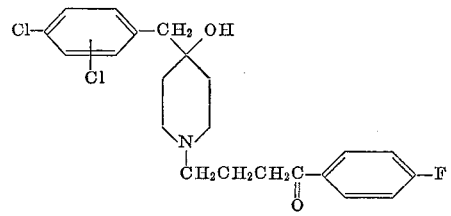

4. A chemical compound of the formula:

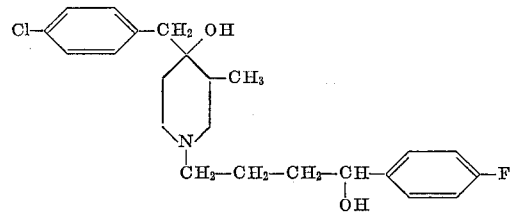

5. A chemical compound of the formula:

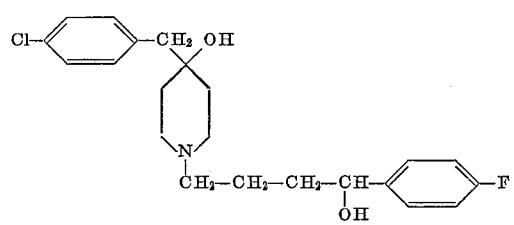

6. 4-[4'-(4''-chlorobenzyl)-4'-hydroxypiperidino] - 4'-fluorobutyrophenone hydrochloride.

7. 4-[4'-(4''-chlorobenzyl) - 4' - hydroxy - 3' - methylpiperidino]-4'-fluorobutyrophenone hydrochloride.

References Cited

UNITED STATES PATENTS 2,904,550   9/1959   Pohland     260—294.3
2,807,585   9/1957   Gardner et al.    260—294.7
2,073,363   2/1961   Janssen     260—293.4

OTHER REFERENCES

Janssen, Australian Patent Application, Abstract No. 47,999/59, 260/294.7. Open to Public Inspection Oct. 22, 1959.

JOHN D. RANDOLPH, Primary Examiner

U.S. Cl. X.R.

260—293.4, 592, 665, 332.3, 570.5, 256, 999